United States Patent Office 3,420,538
Patented Jan. 7, 1969

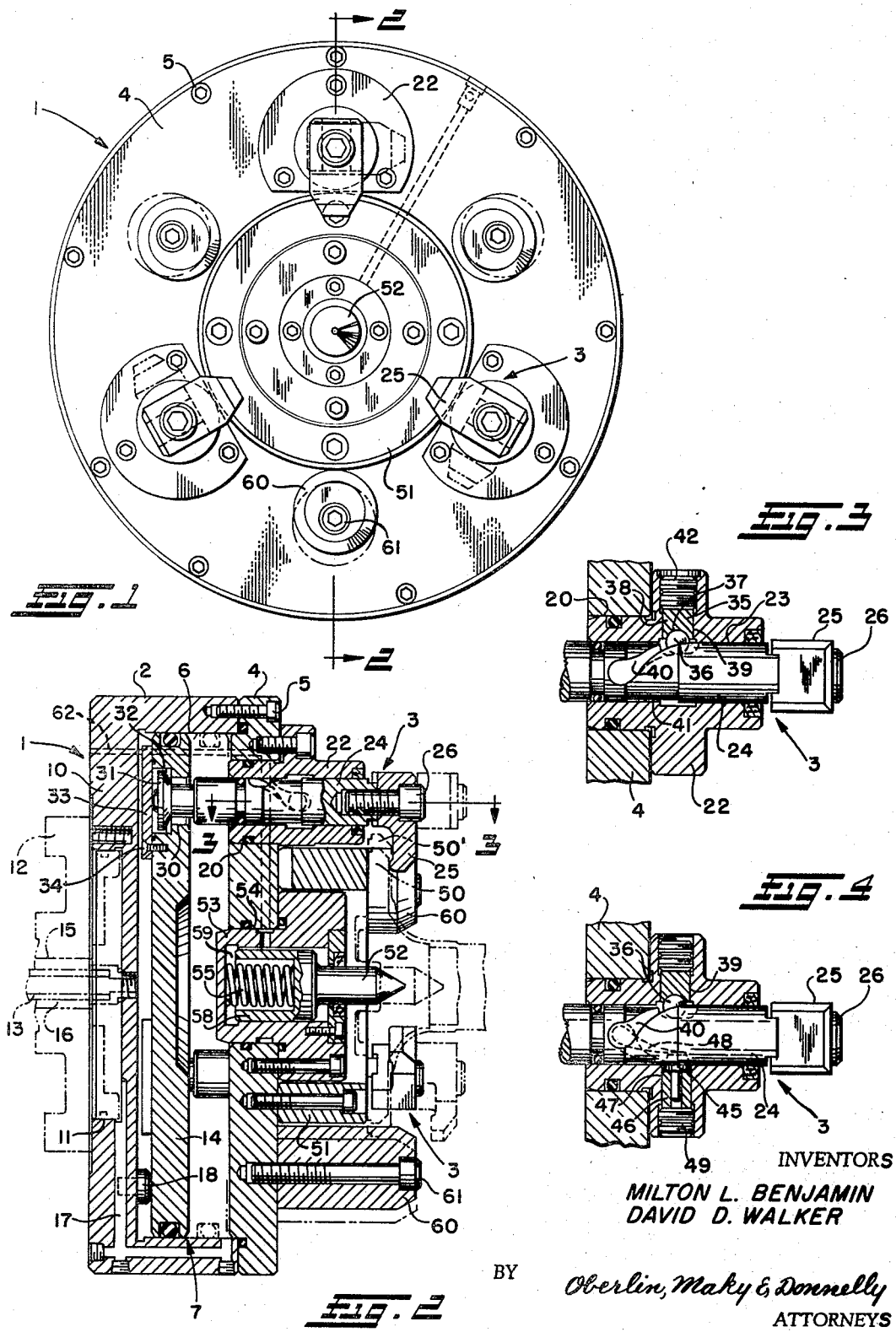

3,420,538
SWIVEL FINGER CHUCK
Milton L. Benjamin and David D. Walker, Chagrin Falls, Ohio, assignors to Erickson Tool Company, Solon, Ohio, a corporation of Ohio
Filed Jan. 21, 1966, Ser. No. 522,066
U.S. Cl. 279—4                 6 Claims
Int. Cl. B23b 5/22; 31/12; B25g 3/22

ABSTRACT OF THE DISCLOSURE

A chuck including a plurality of swivel clamping fingers having jaw portions with shank portions operatively connected to an actuating piston for axial movement therewith while permitting relative rotation therebetween, and means in the form of cam ball followers and/or tapered cam followers carried by the chuck housing which engage spiral cam grooves in the shank portions of the clamping fingers for causing radial swinging movement of the jaw portions during such axial movement. Adjusting screws permit adjustment of the followers to compensate for play and wear of the mating parts.

---

This invention relates generally, as indicated, to a swivel finger chuck and, more particularly, to a novel chuck construction including a plurality of clamp fingers which are adapted to be actuated in an axial direction both toward and away from a workpiece to be gripped thereby during which such clamp fingers are automatically swung into and out of position overlying such workpiece, respectively, to facilitate removal and replacement thereof.

In prior art chuck constructions, it is known to mount the chuck jaws for both pivoting and axial movement into and out of engagement with a workpiece. However, heretofore such chuck jaws have been power actuated in one direction only with a spring mechanism provided for their return movement, which greatly reduces the maximum amount of gripping force that can be applied to a workpiece. Moreover, the structure for mounting the chuck jaws in the chuck housing to effect such pivoting and axial movement is usually quite complex and includes a great many parts.

It is therefore a principal object of this invention to provide a much more simplified and less expensive chuck of the type discussed with swivel clamping fingers mounted for both swinging and axial movement into and out of clamping engagement with a workpiece.

Another object is to provide such a chuck with a double acting hydraulic piston-cylinder assembly for axially moving such swivel clamping fingers toward and away from the chuck housing, including a novel rotatable connection between such clamping fingers and piston.

Still another object is to provide a chuck of the type indicated with novel means for causing such clamping fingers to swivel or pivot into and out of position overlying a workpiece to be clamped thereby in response to such axial movements of the clamping fingers toward and away from the workpiece, respectively.

A further object is to provide such a chuck with a novel spring-loaded centering spindle for accurately aligning a workpiece with the chuck housing just prior to clamping and for ejecting such workpiece from the chuck when the clamping pressure is released and the swivel clamping fingers are moved out of the way.

A yet further object is to provide such a chuck with a plurality of eccentrically mounted locating pins for guiding the workpiece toward the spring-loaded centering spindle.

Other objects and advantages of the present invention will become apparent as the following desecription proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is an end elevation view of a preferred form of swivel finger chuck constructed in accordance with the present invention as seen from the right in FIG. 2;

FIG. 2 is a central longitudinal section of the chuck of FIG. 1 taken on the plane of the line 2—2 thereof;

FIG. 3 is an enlarged fragmentary longitudinal section through one of the swivel clamp fingers of FIG. 2 taken on the plane of the line 3—3 thereof showing the novel manner in which the clamping fingers are mounted for rotational movement in opposite directions during axial inward and outward movement of such fingers; and FIG. 4 is an enlarged fragmentary longitudinal section similar to FIG. 3, but showing another form of mounting for the clamping fingers to achieve the desired swivelling movement.

Turning now to the details of the preferred form of swivel finger chuck illustrated by way of example in the drawing, and first of all to FIGS. 1 and 2, such chuck is generally indicated by the reference numeral 1 and includes a chuck housing 2 on which there are mounted a plurality of swivel clamping fingers 3 for both axial and pivotal movement into and out of engagement with a workpiece to be clamped thereby, in a manner which will be made readily apparent in the discussion to follow. The chuck housing 2 is preferably cup-shaped with an end plate 4 secured to the open end thereof as by means of suitable fasteners 5 to provide therein a cylindrical chamber 6 of a piston-cylinder assembly 7.

The base 10 of the chuck housing 2 may be provided with an annular recess 11 to facilitate mounting of the chuck 1 on an adapter 12, shown in phantom lines in FIG. 2, for attachment to a spindle of a machine tool or the like. Also shown in phantom lines in FIG. 2 is an air supply pipe 13 threadedly connected to a tapped opening in the housing base 10 which communicates with the chamber 6 adjacent the base end thereof for admitting air or other hydraulic fluid into the chamber 6 to cause axial outward movement of the piston 14. The air supply pipe 13 extends through a bore 15 in the adapter 12 and defines with the bore wall an air supply passage 16 communicating with another passage 17 in the chuck housing 2 which leads to the chamber 6 adjacent the plate end thereof for admitting air to cause the piston 14 to move in the opposite direction into engagement with a stop pin 18. Of course, while air is being admitted through the air supply pipe 13 to the base end of the chamber 6, air trapped on the other side of the piston 14 is permitted to escape through the passages 17, 16, and vice versa. Suitable seals are provided where necessary to make the chamber 6 fluid tight.

Bolted or otherwise secured to the outer surface of the end plate 4 in axial alignment with circumferentially spaced openings 20 in such end plate are a corresponding number of bronze bushings 22, each of which has a longitudinal bore 23 therethrough for receipt of the shank portion 24 of a swivel clamping finger 3. The outer end of each shank portion 24 has a work gripping jaw 25 keyed thereto with a locking screw 26 extending through the jaw into the shank portion.

As clearly shown in FIG. 2, the shank portions 24 extend into the chamber 6 through openings 30 in the piston 14 with the inner ends 31 of such shank portions being enlarged for receipt in counterbores 32, and cover plates 33 attached to the piston 14 by fasteners 34 enclose the counterbores 32. This provides a very simple and yet effective connection between the clamping fingers 3 and piston 14 for effecting axial movement of the clamping fingers 3 upon actuation of the piston 14 while permitting pivoting of the clamping fingers during such axial movement.

There is a swivel connection 35 between the bushings 22 and shank portions 24 for effecting the desired pivotal movement of the clamping fingers 3, comprising a cam ball follower 36 disposed in the socket 37 of a sleeve 38 contained within a transverse bore 39 in the bushing 22. As perhaps best shown in FIG. 3, the cam ball follower 36 extends into a spiral groove cam slot 40 formed in the wall of the shank portion 24 preferably on a 46½° helix using a ⅜ inch diameter ball end mill. Such cam slot 40 may be located in a relief area 41 on the shank portion 24, whereby should any burrs or the like be present, they will not interfere with the movement of the clamping fingers 3. The cam ball follower 36 is maintained in contact with the cam slot 40 by a set screw 42 threaded into the outer end of the bore 39 which permits adjustment of the cam ball follower 36 to compensate for any wear that might take place between the mating parts during use.

Although the single cam ball follower 36 has proven to be quite satisfactory in effecting the desired swinging movement of the clamping fingers 3 during axial movement thereof, if desired an additional cam ball follower may be provided directly opposite the cam ball follower 36 for engaging a similar cam slot 40, or a tapered cam member 45 of the type shown in FIG. 4 may be used. Such tapered cam member 45 is carried by a sleeve 46 in a transverse bore 47 diametrically opposite the bore 39 for engagement in a correspondingly shaped cam slot 48 formed in the shank portion 24, also preferably on a 46½° helix, but using a tapered end mill. Adjustment of the tapered cam member 45 to compensate for play between the shank portion 24 and bushing bore 23 or wear of the mating parts is accomplished in the same manner discussed above with regard to the cam ball follower 36; i.e. by adjusting a set screw 49 threadedly engaging the outer end of the transverse bore 47.

It can now be seen that movement of the piston 14 axially outwardly will cause a corresponding axial outward movement of the swivel clamping fingers 3 during which such clamping fingers will be caused to swing in a radial direction away from the axis of the chuck 1 to the phantom line position shown in FIGS. 1 and 2 to permit easy insertion and removal of a workpiece such as the gear 50 shown in phantom lines in FIG. 2. When the gear 50 is properly positioned in axial alignment with the chuck between the gripping jaws 25 and a supporting ring 51 carried by the end plate 4, the piston 7 is actuated in the opposite direction to cause axial inward movement of the clamping fingers 3, during which such clamping fingers are swung radially inwardly to the clamping position shown in solid lines in FIGS. 1 and 2 overlying the gear 50 and tightly gripping the same with the inner surface of the gear resting on the supporting ring 51. While three such clamping fingers are shown in the form illustrated, it should be understood that there may be more or less clamping fingers as desired.

To insure proper axial alignment of the workpiece 50 with respect to the axis of the chuck 1, there may be provided a spring-loaded centering spindle 52 which is carried by a bushing 53 clamped in a central opening 54 in the end plate 3 with the axis of the centering spindle 52 coinciding with the axis of the chuck. The centering spindle 52 is normally spring biased axially outwardly by a compression spring 55 disposed in a bore 56 in the spindle and engaging the bottom wall 57 of the bushing 53. When in this extended position, the centering spindle 52 will engage the workpiece 50 prior to its being tightly clamped by the jaws 23, thus centering the workpiece prior to clamping. Then as the jaws 25 are axially and pivotally moved into gripping engagement with the workpiece, the centering spindle 52 will maintain such workpiece in axial alignment with the chuck 1 while the spindle itself is forced axially inwardly by the workpiece against the bias of the spring 55. The spindle plunger 58 is shown contained within a fluid tight chamber 59 filled with hydraulic fluid for cushioning the movement of the centering spindle 52, and there is a weep hole 62 communicating with the chamber 59 for permitting the escape of excess fluid during such movement.

In addition to performing the centering function just described, the centering spindle 52 will also eject the workpiece 50 when the clamping jaws 25 are moved to the phantom line position clear of the workpiece, since the spring 55 will then force the centering spindle 52 axially outwardly with a considerable force which will vary depending on the strength of spring used and the amount that such spring has been compressed.

A plurality of circumferentially spaced eccentrically mounted locating pins 60 may be provided on the end plate 4 for directing the workpiece 50 toward the centering spindle 52. The eccentric mounting of the locating pins 60 permits ready adjustment of the same for accommodating workpieces of different sizes simply by loosening the fasteners 61, rotating the pins 60 to the position desired, and retightening such fasteners. Two different positions of the locating pins 60 are illustrated in FIG. 2, one in solid lines and the other in phantom, for accommodating two different sized gears 50 and 50'.

From the above discusison, it can now be seen that the swivel finger chuck of the present invention is of a unique and simple construction which permits ready clamping and releasing of a workpiece by clamping jaws which are mounted for both pivotal and axial movement into and out of engagement with a workpiece. The chuck is provided with a novel spring biased centering spindle for accurately aligning the axis of the workpiece with respect to the chuck, and a plurality of eccentrically mounted locating pins for guiding such work toward the centering spindle.

Other modes of applying the principles of the invention may be employed, change being made as regards the details described, provided the features stated in any of the following claims or the equivalent of such be employed.

We therefore, particularly point out and distinctly claim as our invention:

1. A chuck for releasably clamping a workpiece comprising a housing, a piston-cylinder assembly contained within said housing, a plurality of swivel clamping fingers each including an axially extending shank portion and a radially extending jaw portion, means connecting said shank portions to said piston for axial movement therewith while permitting relative rotation therebetween, and means for causing radial swinging movement of said jaw portions into and out of position overlying a workpiece disposed between said jaw portions and housing during axial movement of said fingers toward and away from said housing, respectively, said last-mentioned means comprising a plurality of cam ball followers carrier by said housing engaging spiral cam grooves in said shank portions, and a plurality of tapered cam followers also carried by said housing and engaging spiral tapered cam grooves in said shank portions.

2. A chuck for releasably clamping a workpiece comprising a housing, a piston-cylinder assembly contained within said housing, a plurality of swivel clamping fingers each including an axially extending shank portion and a radially extending jaw portion, means connecting said shank portions to said piston for axial movement therewith while permitting relative rotation therebetween, and means for causing radial swinging movement of said jaw portions into and out of position overlying a workpiece disposed between said jaw portions and housing during axial movement of said fingers toward and away from said housing, respectively, said last-mentioned means comprising a plurality of cam ball followers carried by said housing each engaging a spiral cam groove in said shank portions, said shank portions extending through the axial bores of bushings secured to said housing, each of said bushings having a transverse bore containing a sleeve with a socket therein for receipt of said cam ball followers, and a set screw threadedly engaging the outer end of each transverse bore for permitting adjustment of said cam ball followers to compensate for play and wear of the mating parts.

3. A chuck for releasably clamping a workpiece comprising a housing, a piston-cylinder assembly contained within said housing, a plurality of swivel clamping fingers each including an axially extending shank portion and a radially extending jaw portion, means connecting said shank portions to said piston for axial movement therewith while permitting relative rotation therebetween, including a plurality of openings in said piston through which said shank portions extend, the inner ends of said shank portions being enlarged, said openings being counterbored for receipt of said enlarged shank end portions, and cover plates over said counterbores, and means for causing radial swinging movement of said jaw portions into and out of position overlying a workpiece disposed between said jaw portions and housing during axial movement of said fingers toward and away from said housing, respectively.

4. A chuck for clamping gears and the like comprising a housing, a plurality of swivel clamping fingers each including an axially extending shank portion and a radially extending jaw portion, means mounting said swivel clamping fingers for axial movement toward and away from said housing, and means for causing radial swinging movement of said jaw portions into and out of position overlying a workpiece disposed between said jaw portions and housing during axial movement of said fingers toward and away from said housing, respectively, said last-mentioned means including a plurality of bushings with axial bores secured to said housing through which said shank portions extend, a transverse bore in each bushing containing a sleeve with a socket therein, a cam follower contained within said socket and engaging a spiral cam groove in each of said shank portions, and a set screw threadedly engaging the outer end of each transverse bore for permitting adjustment of said cam followers to compensate for play and wear of the mating parts, said cam followers being in the form of balls, and said last-mentioned means further comprising a plurality of tapered cam followers carried by said housing and engaging tapered cam grooves in said shank portions directly opposite said first-mentioned spiral cam grooves.

5. The chuck of claim 2 further comprising a spring-loaded centering spindle carried by said housing for centering such workpiece both during and prior to clamping of such workpiece by said jaw portions.

6. The chuck of claim 5 further comprising a plurality of locating pins carried by said housing for directing such workpiece towards said centering spindle, said locating pins being eccentrically mounted for adjustment to different positions to accommodate different sized workpieces.

References Cited

UNITED STATES PATENTS

| | | | |
|---|---|---|---|
| 753,275 | 3/1904 | Johnson | 279—1 |
| 1,412,170 | 4/1922 | Dixon | 279—4 |
| 2,291,687 | 8/1942 | Brobst | 279—6 X |
| 2,784,002 | 3/1957 | Stace et al. | 279—4 |
| 2,809,612 | 10/1957 | Highberg | 279—4 X |
| 1,881,905 | 10/1932 | Page | 279—106 |
| 2,885,212 | 5/1959 | Garrison | 279—106 |

ROBERT C. RIORDON, *Primary Examiner.*

J. C. PETERS, *Assistant Examiner.*

U.S. Cl. X.R.

279—106